United States Patent [19]
Inamori

[11] Patent Number: 5,519,456
[45] Date of Patent: May 21, 1996

[54] MOTION DETECTING CIRCUIT AND NOISE REDUCING CIRCUIT UTILIZING POLARITY DETERMINATION FOR PIXEL BLOCK OF A VIDEO DISPLAY

[75] Inventor: Shinri Inamori, Yokohama, Japan

[73] Assignee: Texas Instruments Incorporated, Dallas, Tex.

[21] Appl. No.: 255,199

[22] Filed: Jun. 7, 1994

[30] Foreign Application Priority Data

Jun. 7, 1993 [JP] Japan .................................. 5-163227

[51] Int. Cl.$^6$ .................................................. H04N 7/28
[52] U.S. Cl. ...................... 348/699; 348/700; 348/411; 348/415; 348/416; 348/405
[58] Field of Search .................................. 348/699, 700, 348/416, 411, 412

[56] References Cited

U.S. PATENT DOCUMENTS

| | | | |
|---|---|---|---|
| 5,051,826 | 9/1991 | Ishii et al. | 348/700 |
| 5,081,532 | 1/1992 | Rabii | 348/700 |
| 5,166,788 | 11/1992 | Lee | 348/699 |
| 5,173,770 | 12/1992 | Kondo et al. | 348/699 |
| 5,237,413 | 8/1993 | Israelsen et al. | 348/699 |
| 5,365,281 | 11/1994 | Ko et al. | 348/699 |

Primary Examiner—Tommy P. Chin
Assistant Examiner—Anand S. Rao
Attorney, Agent, or Firm—William E. Hiller; Richard L. Donaldson

[57] ABSTRACT

A motion detecting circuit and a noise reducing circuit of high reliability and independent of the magnitude of motion, presence/absence of noise, and magnitude of the noise. The motion detecting circuit includes a subtractor 14 which receives as inputs, an input video signal $VS_i$ from an input terminal 10 and a delayed video signal $VS_d$ delayed by one picture unit (one frame in the case of the NTSC format) from a frame memory 12. The difference between the two signals $VS_i$ and $VS_d$ is taken and a difference signal e is output for each pixel of a video display. A motion determination circuit 16 is provided, having: a difference polarity determination unit which determines the polarity of difference e as input from a difference generating unit 15 for each pixel and its adjacent pixels; a difference value determination unit which determines the magnitude of difference e as input from difference generating unit 15 for each pixel and its adjacent pixels; and a motion determination unit which determines whether the pixel is contained in the motion picture region based on the results of the determination of the difference polarity determination unit and the difference value determination unit; and a 1-bit motion determination signal MC representing the results of the determination of the motion determination unit is output.

11 Claims, 8 Drawing Sheets

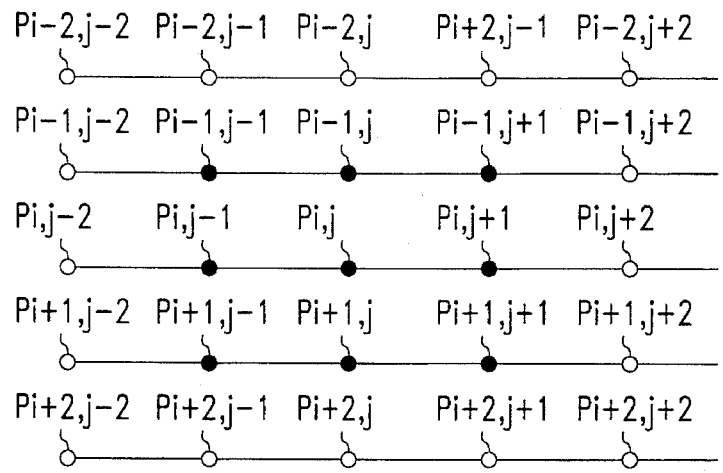
Fig. 3
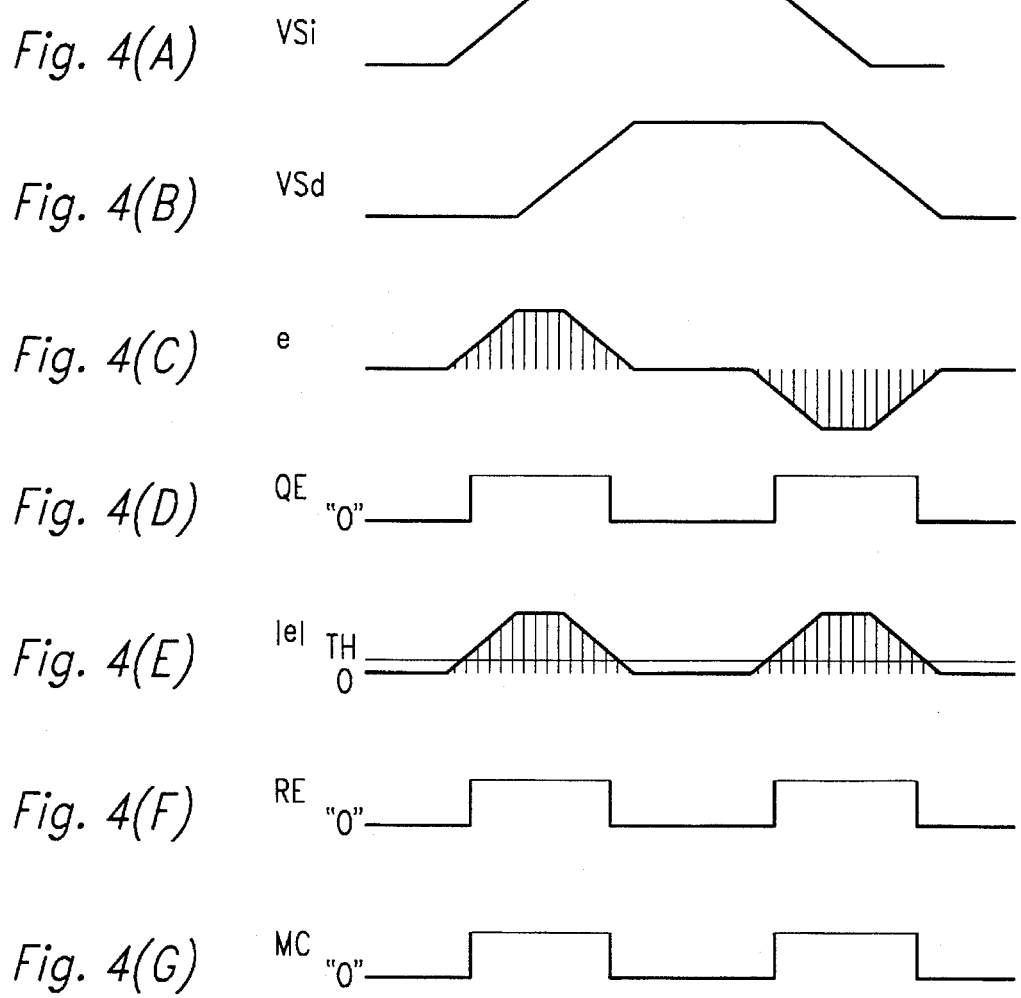
Fig. 4(A) VSi
Fig. 4(B) VSd
Fig. 4(C) e
Fig. 4(D) QE "0"
Fig. 4(E) |e| TH 0
Fig. 4(F) RE "0"
Fig. 4(G) MC "0"

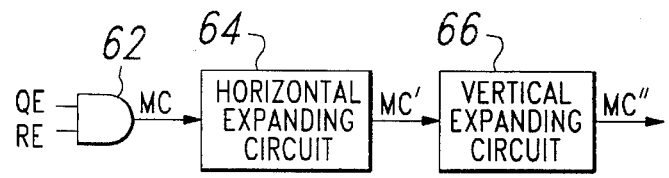
Fig. 5
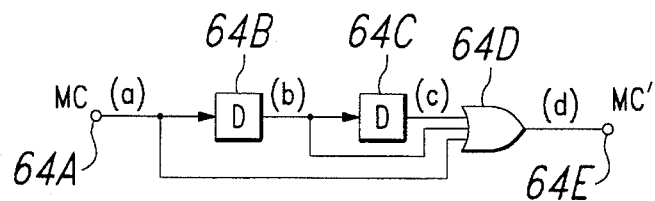
Fig. 6
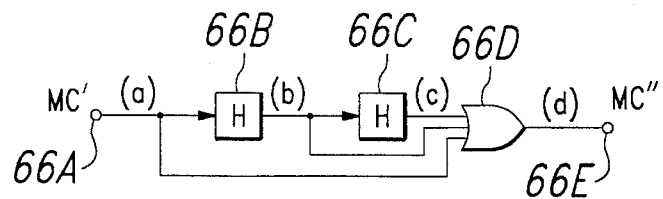
Fig. 7
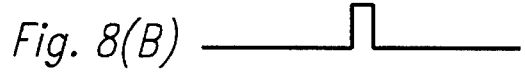
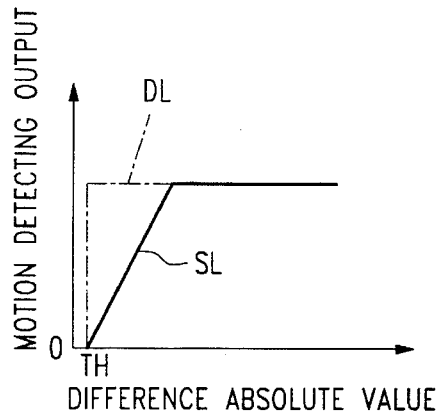
Fig. 9

MOTION DETECTING CIRCUIT AND NOISE REDUCING CIRCUIT UTILIZING POLARITY DETERMINATION FOR PIXEL BLOCK OF A VIDEO DISPLAY

This invention pertains to a motion detecting circuit for detecting a motion picture or a motion picture region, particularly in a video display, and a noise reducing circuit which can reduce the noise level contained in a video signal.

BACKGROUND OF THE INVENTION

FIG. 16 is a diagram illustrating the configuration of a conventional motion detecting circuit used in a digital TV receiver, etc. Input to input terminal 100 is video signal $VS_i$, which is an 8-bit TV signal prepared by A/D conversion after demodulation. This input video signal $VS_i$ is sent both to one input terminal of subtractor 102 and frame memory 104 and edge detecting circuit 106. Frame memory 104 sends the video signal of the previous picture, that is, the video signal of one previous frame in the NTSC format, as delayed video signal $VS_d$ to the other input terminal of subtractor 102.

Subtractor 102 subtracts delayed video signal $VS_d$ from input video signal $VS_i$ to derive the difference in units of pixels. Difference signal e output from subtractor 102 is converted to absolute value |e| by absolute value circuit 108, and the absolute value is then sent to nonlinear processing circuit 110. Nonlinear processing circuit 110 has the nonlinear input/output characteristics shown in FIG. 17. It outputs output signal f as, for example, a 6-bit signal, corresponding to input difference absolute value |e| to one input terminal of divider 112.

Edge detecting circuit 106 passes input image signal $VS_i$ to two-dimensional high pass filter and outputs in, for example, a 4-bit signal form, edge detection signal eg which is expressed with even a fineness of edge corresponding to a determination on whether each pixel is within the edge portion (profile) portion. The signal eg is sent to the other input terminal of divider 112. At divider 102, one input signal f is divided by the other input signal eg, and the quotient h (f/eg) is output in, for example, 4-bit signal form. Output signal h of divider 112 is quantized to the desired bit number by quantization circuit 114, and the signal is output from output terminal 116 as a multivalue (for example, 2-bit) or binary (1-bit) motion signal ms.

In the static picture region, as the difference e between input video signal $VS_i$ and delayed video signal $VS_d$ of the previous picture, and its absolute value |e| is null or near null, that is, the value is smaller than threshold TH of nonlinear processing circuit 110, no significant output signal f is generated by nonlinear processing circuit 110, and the value of motion signal ms is null.

On the other hand, in the motion picture region, the absolute value of the difference |e| becomes larger than the threshold TH, and a significant output signal f is generated by nonlinear processing circuit 110, and signal ms also becomes a significant value corresponding to the magnitude of the motion. In addition, for the various portions within the motion picture region making the same motion, the difference absolute value |e| at the edge portion is larger than that at the flat portion. Consequently, division processing is performed by using edge detecting signal eg, and the sensitivity is adjusted for the motion at the various portions in the motion picture region.

However, as input video signal $VS_i$ contains the noise in the transmission system and receiving/demodulating system, difference e obtained at the output terminal of subtractor 102 also contains the noise component. In the conventional motion detecting circuit, when the noise level is high in a static picture or in the static picture region of a picture, difference absolute value |e| may exceed threshold TH of the nonlinear processing circuit 110, and a significant motion signal ms may be generated erroneously. When threshold TH is increased to eliminate this problem, when the motion in the motion picture region is small, that is, when difference e is small, difference absolute value |e| cannot exceed threshold TH, and no significant motion signal ms can be generated. This is also undesirable.

As explained above, for the conventional motion detecting circuit, depending on whether the difference absolute value of the pixel unit between the current picture (input video signal) and the preceding picture (delayed video signal) exceeds the threshold TH of nonlinear processing circuit 110, a determination is made on whether the pixel is in the motion picture region or the static picture region containing noises. For this method, small motion may be taken erroneously as noise, while large noise may be picked up as motion. This is a disadvantage.

It is an object of this invention to provide a motion detecting circuit of high reliability having the capability of correctly detecting the motion picture or motion picture region independent of the magnitude of the motion, presence/absence of noise, and magnitude of the noise.

Another object of this invention is to provide a noise reducing circuit of high reliability having the capability of performing a noise reducing procedure for the motion picture or motion picture region independent of the magnitude of motion, with noise reduction being performed only for the static picture or static picture region.

SUMMARY OF THE INVENTION

In accordance with the invention, a motion detecting circuit is provided which comprises: a difference generating means which takes the difference between an input video signal and a delayed video signal delayed by one picture as a unit; a difference polarity determination means which determines the polarity of the difference obtained using the difference generating means for each pixel and the other prescribed pixels in its vicinity; a difference value determination means which determines the magnitude of the difference derived using the difference generating means and the other prescribed pixels in its vicinity; and a motion determination means which determines whether the pixel is in the motion picture region based on the results of the determination by the difference polarity determination means and the difference value determination means.

In another aspect of this invention, a noise reducing circuit is provided which comprises: a difference generating means which takes the difference between an input video signal and a delayed video signal delayed by one picture as a unit; a noise reducing means which performs the noise reducing procedure for the input video signal based on the difference obtained using the difference generating means; a difference polarity determination means which determines the polarity of the difference obtained using the difference generating means for each pixel and the other prescribed pixels in its vicinity; a difference value determination means which determines the magnitude of the difference derived using the difference generating means and the other prescribed pixels in its vicinity; a motion determination means which determines whether the pixel is in the motion picture region based on the results of determination by the difference polarity determination means and the difference value determination means; a noise reducing procedure inhibiting means which inhibits the noise reducing procedure of the noise reducing means in the motion picture region based on the results of the determination by the motion determination means.

For a motion picture or in a motion picture region, when a certain pixel varies over time, it is highly probable that the pixels in its vicinity also vary in the same direction and to a similar degree. Consequently, when said pixel is checked to determine whether there is any change over time (whether it belongs to the motion picture region) or not (whether it belongs to the static picture region), a more correct result can be obtained in the determination when the direction of change (polarity of the difference) and degree of change (magnitude of the difference) are also determined for the nearby pixels in addition to said concerned pixel.

In the motion detecting circuit of this invention, for the difference between the input video signal and the delayed video signal derived using the difference generating means, a determination is made on the polarity (sign) of the difference and magnitude (absolute value) of the difference for each pixel and other prescribed pixels in its vicinity. Based on the polarity and magnitude of the multiple differences corresponding to these multiple pixels, a motion determination means determines whether said pixel is in a motion picture region or in a static picture region.

In the noise reducing circuit of this invention, the motion detecting circuit of this invention determines whether the pixel belongs to the motion picture region for each pixel. Based on the result of the determination, a noise reducing means performs the noise reducing procedure only for the static picture region, while it does not perform the noise reducing procedure for the motion picture region. As correct motion detection information can be obtained by the motion detecting circuit independent of the magnitude of the motion, the noise reducing procedure is not performed for the motion picture region no matter what magnitude the motion has, and the noise reducing procedure is applied only for the static picture region.

BRIEF DESCRIPTION OF THE DRAWINGS

FIG. 3 is a schematic diagram illustrating the configuration of the pixels for explaining the function of the motion detecting circuit in the embodiment of FIG. 1.

FIGS. 4(A)–4(G) are diagrams illustrating the signal waveforms at various portions for explaining the function of the motion detecting circuit in the embodiment of FIG. 1.

FIG. 5 is a block diagram illustrating a modified example of the output portion of the motion detecting circuit in the embodiment of FIG. 1.

FIG. 6 is a circuit diagram illustrating the specific configuration of the horizontal expanding circuit in FIG. 5.

FIG. 7 is a circuit diagram illustrating the specific configuration of the vertical expanding circuit in FIG. 5.

FIGS. 8(A)–8(D) are diagrams illustrating the waveforms of the signals at various portions of the horizontal expanding circuit and vertical expanding circuit in FIGS. 6 and 7.

FIG. 9 is a graph of the motion detecting characteristics of the motion detecting circuit in the embodiment of FIG. 1.

Figure 1:
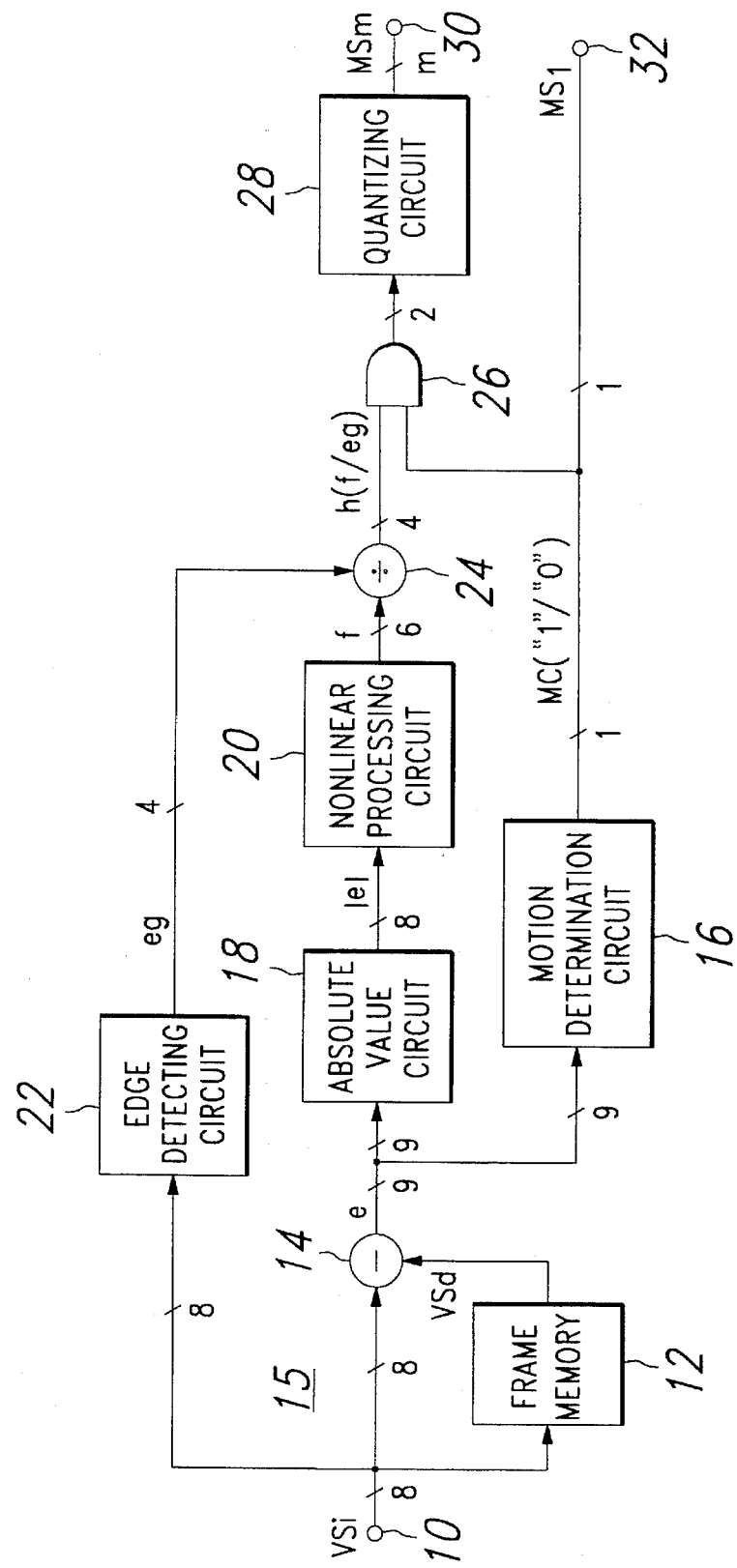
FIG. 1 is a block diagram illustrating the motion detecting circuit in an embodiment of this invention.

Reference numerals as shown in the drawings:

12, 86, frame memory
14, 84, subtractor
16, 92, motion determination circuit
40, difference polarity determination unit
50, difference value determination unit
60, motion determination unit
82, adder
88, coefficient multiplier

DESCRIPTION OF PREFERRED EMBODIMENTS

FIG. 1 illustrates the motion detecting circuit in an embodiment of this invention. This motion detecting circuit receives as an input signal the video signal $VS_i$ in the form of an 8-bit TV signal processed by A/D conversion after demodulation, and it detects, in units of pixels, the motion picture region on the picture for the input video signal $VS_i$. Basically, this motion detecting circuit comprises a frame memory 12, subtractor 14, and motion determination circuit 16.

Frame memory 12 and subtractor 14 form a difference generating unit 15. The input from input terminal 10 to subtractor 14 and to frame memory 12 includes an 8-bit input video signal $VS_i$ and a further input as a single picture unit (one frame unit in the case of the NTSC format) delayed 8-bit delayed signal $VS_d$ to the subtractor 14 from the frame memory 12. For each pixel, the difference between the two signals $VS_i$ and $VS_d$ is taken, and a 9-bit difference signal e is output. Difference signal e output from subtractor 14 is sent to motion determination circuit 16.

As to be explained later, motion determination circuit 16 includes the following parts: a difference polarity determination unit which determines the polarity of difference e input from difference generating unit 15 for each pixel and the other pixels in its vicinity; a difference value determination unit which determines the magnitude of difference e input from difference generating unit 15 for each pixel and the other prescribed pixels in its vicinity; and a motion determination unit which determines whether it is in a motion picture region or in a static picture region for each pixel based on the results of determination of the difference polarity determination unit and the difference value determination unit. It then outputs motion determination signal MC which represents the results of the determination of the motion determination unit. The motion determination signal MC takes the logic value of "1" when the pixel is in the motion picture region, and it takes the logic value of "0" when the pixel is in the static picture region.

Figure 16:
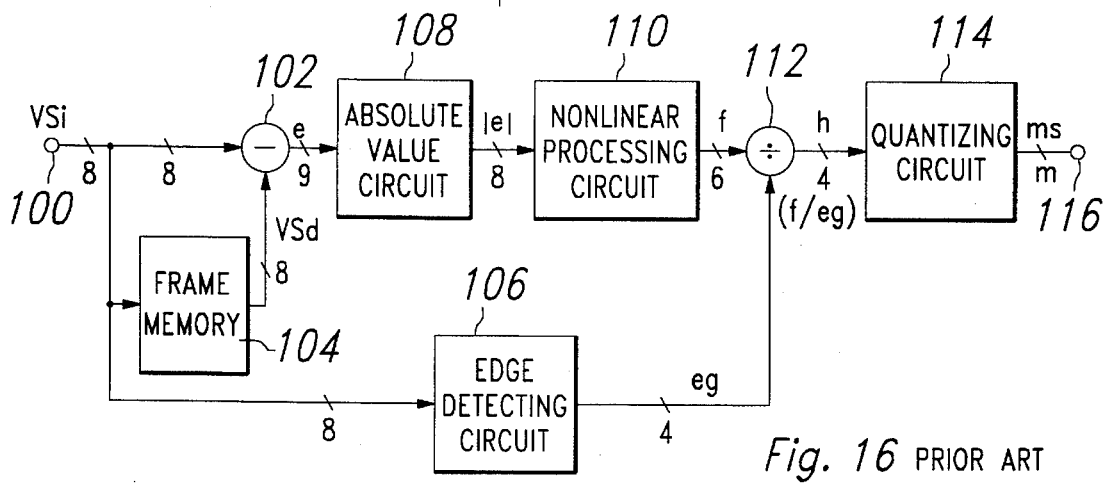
FIG. 16 is a block diagram illustrating a conventional motion detecting circuit.
Figure 17:
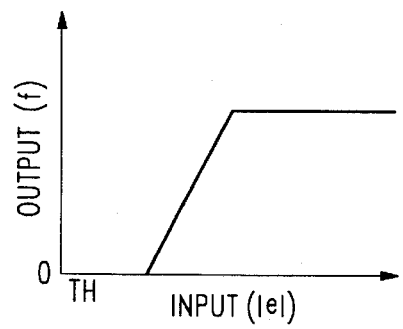
FIG. 17 is a graph illustrating the input/output characteristics of the nonlinear processing circuit in the motion detecting circuit of FIG. 16.

Absolute value circuit 18, nonlinear processing circuit 20, and quantizing circuit 28 connected to the output of subtractor 14 may have the same structures and functions as absolute value circuit 108, nonlinear processing circuit 110, and quantizing circuit 114 in a conventional motion detecting circuit (FIG. 16). In this embodiment, these circuits 18, 20, and 28 are needed for obtaining a multivalue (2-bit or more) motion signal $MS_m$. In this case, motion determination signal MC from motion determination circuit 16 acts as an initial signal with respect to AND circuit 26. Also, AND circuit 26, with a number equal to the bit number of the output signal of divider 24, is arranged in parallel. However, when determination signal MC from motion determination circuit 16 is directly sent as a binary (1-bit) motion signal $MS_1$ from output terminal 32, it is possible to omit the circuits 18, 20, and 28. Also, it is possible to omit motion sensitivity adjusting edge detecting circuit 22 and divider 24 depending on the necessity.

Figure 2:
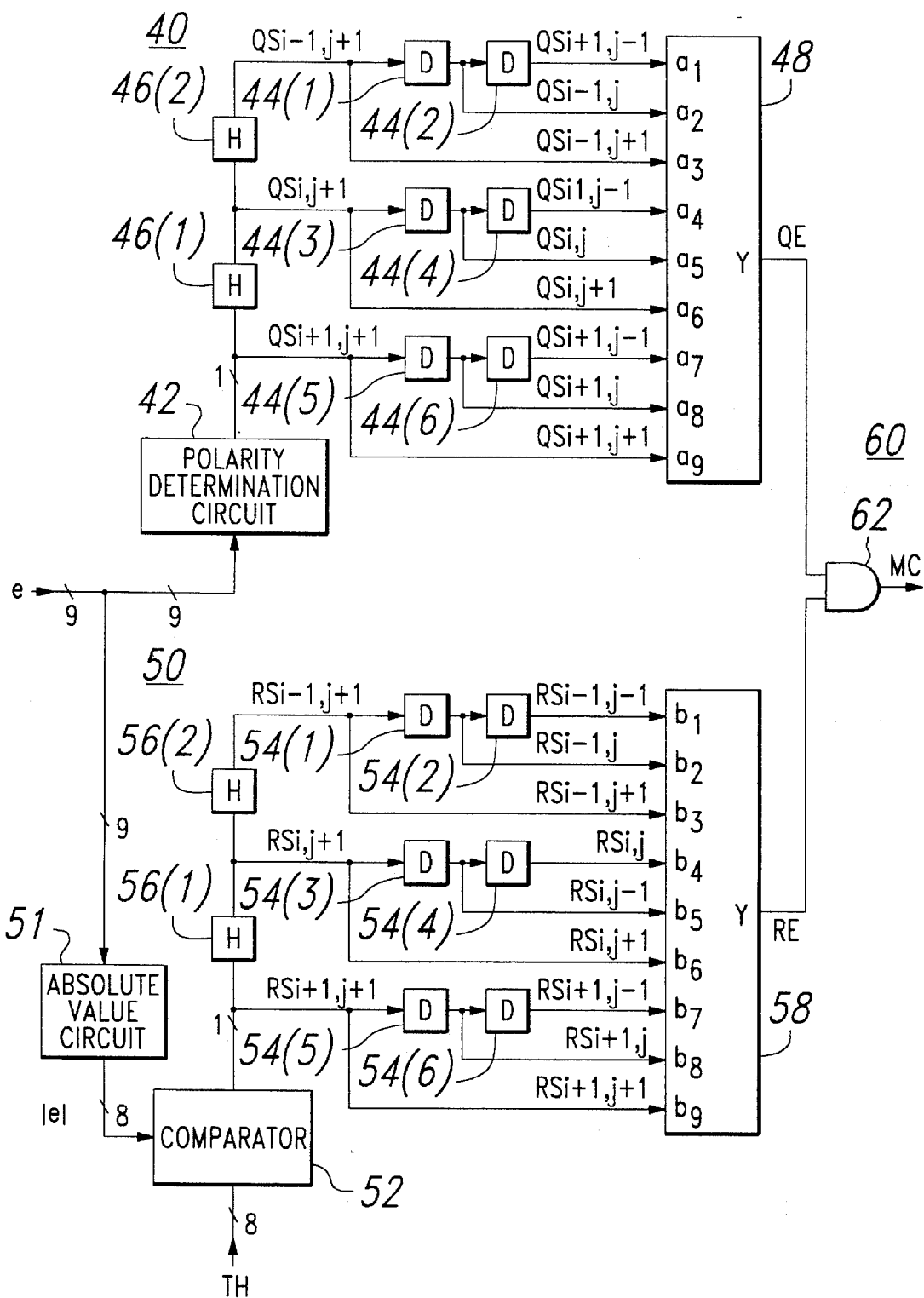
FIG. 2 is a block diagram illustrating the motion determination circuit in the motion detecting circuit shown in FIG. 1.

FIG. 2 illustrates an example of a motion determination circuit 16. In this motion determination circuit 16, difference polarity determination unit 40 includes the following circuits: polarity determination circuit 42, six sample delay circuits 44(1)–44(6) which provide 1-pixel-clock delay time (D), two line delay circuits 46(1) and 46(2) which provide 1-horizontal-scan-period delay time (H), and a 9-input block difference polarity determination circuit 48 which generates an output signal of logic value "1" and outputs it through output terminal Y only when all of the nine binary signals input to its nine input terminals a1–a9 are "1" or all of them are "0".

From the most significant bit, that is, the carry bit of 9-bit difference signal e input from subtractor 14, polarity determination circuit 42 determines the polarity (sign) of difference e for each pixel. When the polarity of difference e for the pixel is positive (+), it takes the value of "1"; when the polarity is negative (−), it takes the value of "0", and the value taken by it is output as a 1-bit difference polarity determination signal QS. Difference polarity determination signal QS output from polarity determination circuit 42 passes through nine routes made of sample delay circuits 44(1)–44(6) and line delay circuits 46(1) and 46(2) and are input to 9 input terminals a1–a9 of block difference polarity determination circuit 48, respectively.

The first route is a delay route which runs through first and second line delay circuits 46(1) and 46(2) and then through first and second sample delay circuits 44(1) and 44(2) to first input terminal a1. The second route is a delay route which runs through first and second line delay circuits 46(1) and 46(2) and then through first sample delay circuit 44(1) to second input terminal a2. The third route is a delay route which runs through first and second line delay circuits 46(1) and 46(2) to third input terminal a3. The fourth route is a delay route which runs through first line delay circuit 46(1) and then through third and fourth sample delay circuits 44(3) and 44(4) to fourth input terminal a4. The fifth route is a delay route which runs through first line delay circuit 46(1) and then through third sample delay circuit 44(3) to fifth input terminal a5. The sixth route is a delay route which runs through first line delay circuit 46(1) and is then sent directly to sixth input terminal a6. The seventh route is a delay route which runs through fifth and sixth sample delay circuits 44(5) and 44(6) to seventh input terminal a7. The eighth route is a delay route which runs through fifth sample delay circuit 44(5) to eighth input terminal a8. The ninth route is a direct route from the output terminal of polarity determination circuit (42) to ninth input terminal a9.

FIG. 3 is a schematic diagram illustrating the pixels distributed in matrix form in the picture. When difference polarity determination signal $QS_{i,j}$ corresponding to pixel $P_{i,j}$ (pixel in ith row and jth column) is input to fifth input terminal a5 of block difference determination circuit 48, difference polarity determination signal $QS_{i-1,j-1}$ corresponding to pixel $P_{i-1,j}$ (pixel in (i−1)th row and (j−1)th column) is input to first input terminal a1, difference polarity determination signal $QS_{i-1,j}$ corresponding to pixel $P_{i-1,j}$ (pixel in (i−1)th row and jth column) is input to second input terminal a2, difference polarity determination signal $QS_{i-1,j+1}$ corresponding to pixel $P_{i-1,j+1}$ (pixel in (i−1)th row and (j+1)th column) is input to third input terminal a3, difference polarity determination signal $QS_{i,j-1}$ corresponding to pixel $P_{i,j-1}$ (pixel in ith row and (j−1)th column) is input to fourth input terminal a4, difference polarity determination signal $QS_{i,j+1}$ corresponding to pixel $P_{i,j+1}$ (pixel in ith row and (j+1)th column) is input to sixth input terminal a6, difference polarity determination signal $QS_{i+1,j-1}$ corresponding to pixel $P_{i+1,j-1}$ (pixel in (i+1)th row and (j−1)th column) is input to seven input terminal a7, difference polarity determination signal $QS_{i+1,j}$ corresponding to pixel $P_{i+1,j}$ (pixel in (i+1)th row and jth column) is input to eighth input terminal a8, and difference polarity determination signal $QS_{i+1,j+1}$ corresponding to pixel $P_{i+1,j+1}$ (pixel in (i+1)th row and (j+1)th column) is input to ninth input terminal a9.

In this way, when difference polarity determination signal $QS_{i,j}$ corresponding to pixel $P_{i,j}$ (pixel in ith row and jth column) is input to block difference determination circuit 48, the difference polarity determination signals $QS_{i-1,j-1}$, $QS_{i-1,j}$, $QS_{i-1,j+1}$, $QS_{i,j-1}$, $QS_{i,j+1}$, $QS_{i+1,j-1}$, $QS_{i+1,j}$, $QS_{i+1,j+1}$ corresponding to the surrounding eight pixels of $P_{i,j}$, $P_{i-1,j-1}$, $P_{i-1,j}$, $P_{i-1,j+1}$, $P_{i,j-1}$, $P_{i,j+1}$, $P_{i+1,j-1}$, $P_{i+1,j}$, $P_{i+1,j+1}$ are also input to the block difference polarity determination circuit 48. That is, the nine difference polarity determination signals corresponding to the nine pixels in a 3×3 pixel block with pixel $P_{i,j}$ at the center are input at the same time to block difference polarity determination circuit 48.

Block difference polarity determination circuit 48 is composed of AND circuit, OR circuit, and other logic circuits. It generates block difference polarity determination signal QE with logic value "1" only when all of the nine difference value determination signals $QS_{i-1,j-1}$, $QS_{i-1,j}$, $QS_{i-1,j+1}$, $QS_{i,j-1}$, $QS_{i,j}$, $QS_{i,j+1}$, $QS_{i+1,j-1}$, $QS_{i+1,j}$, $QS_{i+1,j+1}$ input corresponding to pixel $P_{i,j}$ are all "1" or are all "0".

In this way, in difference polarity determination unit 40, the polarity (sign) of difference e in the pixel unit between the default picture (the input video signal) and the preceding picture (delayed video signal) is determined for the pixel concerned as well as its eight adjacent pixels (in the 3×3 pixel block). Only when the polarities of the nine differences corresponding to these nine pixels are all "1" or are all "0", is block difference polarity determination signal QE of logic value "1" output.

In the motion picture region, as a pixel varies over time, the same variation pattern is displayed also by its adjacent pixels (in the 3×3 pixel block); hence, when the nine differences corresponding to these nine pixels all have the same polarity (that is, all of the nine difference polarity determination signals QS are "1" or all are "0"), a block difference polarity determination signal QE with a logic value of "1" is obtained. This block difference polarity determination signal QE is sent to one input terminal of AND circuit 62.

In the static picture region, when noise is contained in video signal VS, a difference e corresponding to noise is generated by difference generating unit 15. However, as the noise appears randomly free of correlation, the polarities of the nine differences e corresponding to the nine pixels in the 3×3 pixel block are different (that is, some of the nine difference polarity determination signals QS are "1", while others are "0"), and a block difference polarity determination signal QE with a logic value of "0" is obtained.

Also, in the static picture region, there may be cases in which there is no substantial noise in video signal VS, where the difference value e output from difference generating unit 15 approaches null, and the nine differences e corresponding to the nine pixels in the 3×3 pixel block all have the same polarity. In this case, block difference polarity determination circuit 48 generates a block difference polarity determination signal QE with a logic value of "1", just as in the case of the motion picture region. However, as explained later, as it is found that the region is a static picture region substantially free of noise by difference value determination means 50, a motion determination signal MC with a logic value of "0" indicating the pixel is in a static picture region is output from motion determination unit 60.

As shown in FIG. 2, in motion detecting circuit 16, difference value determination unit 50 is composed of the following parts: absolute value circuit 51, comparator 52, six sample delay circuits 54(1)–54(6) which provide 1-pixel-clock delay time (D), two line delay circuits 56(1) and 56(2) which provide 1-horizontal-scan-period delay time (H), and a 9-input block difference polarity determination circuit 58 which generates an output signal of logic value "1" and outputs it through output terminal Y only when all of the nine binary signals input to its nine input terminals b1–b9 are "1" or all of them are "0".

Absolute value circuit 51 receives difference signal e from subtractor 14 as its input, and outputs its absolute value |e|. Comparator 52 compares difference absolute value |e| from absolute value circuit 51 with a prescribed reference value for comparison or with threshold TH. If |e| > TH, the 1-bit difference value determination signal RS to be output takes the logic value of "1"; when |e| ≤ TH, it takes "0". Difference value determination signal RS output from comparator 52 passes through nine routes including sample delay circuits 54(1)–54(6) and line delay circuits 56(1) and 56(2) and are input to nine input terminals b1–b9 of block difference value determination circuit 58, respectively.

The first route is a delay route which runs through first and second line delay circuits 56(1) and 56(2) and then through first and second sample delay circuits 54(1) and 54(2) to first input terminal b1. The second route is a delay route which runs through first and second line delay circuits 56(1) and 56(2) and then through first sample delay circuit 54(1) to second input terminal b2. The third route is a delay route which runs through first and second line delay circuits 56(1) and 56(2) to third input terminal b3. The fourth route is a delay route which runs through first line delay circuit 56(1) and then through third and fourth sample delay circuits 54(3) and 54(4) to fourth input terminal b4. The fifth route is a delay route which runs through first line delay circuit 56(1) and then through third sample delay circuit 54(3) to fifth input terminal b5. The sixth route is a delay route which runs through first line delay circuit 56(1) and is then sent directly to sixth input terminal b6. The seventh route is a delay route which runs through fifth and sixth sample delay circuits 54(5) and 54(6) to seventh input terminal b7. The eighth route is a delay route which runs through fifth sample delay circuit 54(5) to eighth input terminal b8. The ninth route is a direct route from the output terminal of value determination circuit (52) to ninth input terminal b9.

FIG. 3 is a schematic diagram illustrating the pixels distributed in matrix form in the picture. When difference value determination signal $RS_{i,j}$ corresponding to pixel $P_{i,j}$ (pixel in ith row and jth column) is input to fifth input terminal b5 of block difference determination circuit 58, difference value determination signal $RS_{i-1,j-1}$ corresponding to pixel $P_{i-1,j-1}$ (pixel in (i–1)th row and (j–1)th column) is input to first input terminal b1, difference value determination signal $RS_{i,j+1}$ corresponding to pixel $P_{i,j+1}$ (pixel in (i–1)th row and jth column) is input to second input terminal b2, difference value determination signal $RS_{i-1,j+1}$ corresponding to pixel $P_{i-1,j+1}$ (pixel in (i–1)th row and (j+1)th column) is input to third input terminal b3, difference value determination signal $RS_{i,j-1}$ corresponding to pixel $P_{i,j-1}$ (pixel in ith row and (j–1)th column) is input to fourth input terminal b4, difference value determination signal $RS_{i,j+1}$ corresponding to pixel $P_{i,j+1}$ (pixel in ith row and (j+1)th column) is input to sixth input terminal b6, difference value determination signal $RS_{i-1,j-1}$ [sic; $RS_{i+1,j-1}$] corresponding to pixel $P_{i-1,j-1}$ [sic; $P_{i+1,j-1}$] (pixel in (i+1)th row and (j–1)th column) is input to seventh input terminal b7, difference value determination signal $RS_{i+1,j}$ corresponding to pixel $P_{i+1,j}$ (pixel in (i+1)th row and jth column) is input to eighth input terminal b8, and difference value determination signal $RS_{i+1,j+1}$ corresponding to pixel $P_{i+1,j+1}$ (pixel in (i+1)th row and (j+1)th column) is input to ninth input terminal b9.

In this way, when difference value determination signal $RS_{i,j}$ corresponding to pixel $P_{i,j}$ (pixel in ith row and jth column) is input to block difference determination circuit 58, the difference value determination signals $RS_{i-1,j-1}$, $RS_{i-1,j}$, $RS_{i-1,j+1}$, $RS_{i,j-1}$, $RS_{i,j+1}$, $RS_{i+1,j-1}$, $RS_{i+1,j}$, $RS_{i+1,j+1}$ corresponding to the surrounding eight pixels $P_{i-1,j-1}$, $P_{i-1,j}$, $P_{i-1,j+1}$, $P_{i,j-1}$, $P_{i,j+1}$, $P_{i+1,j-1}$, $P_{i+1,j}$, $P_{i+1,j+1}$ are also input to the block difference value determination circuit 58. That is, the nine difference value determination signals corresponding to the nine pixels in a 3×3 pixel block with pixel $P_{i,j}$ at the center are input at the same time to block difference value determination circuit 58.

Block difference value determination circuit 58 is composed of AND circuit, OR circuit, and other logic circuits. It generates block difference value determination signal RE with a logic value "1" only when all of the nine difference value determination signals $RS_{i-1,j-1}$, $RS_{i-1,j}$, $RS_{i-1,j+1}$, $RS_{i,j-1}$, $RS_{i,j}$, $RS_{i,j+1}$, $RS_{i+1,j-1}$, $RS_{i+1,j}$, $RS_{i+1,j+1}$ input corresponding to pixel $P_{i,j}$ are all "1" or are all "0".

In this way, in difference value determination unit 50, the absolute value of difference e in pixel unit between the default picture (the input video signal) and the preceding picture (delayed video signal) is determined for the pixel concerned as well as its eight adjacent pixels (in the 3×3 pixel block). Only when the absolute values of the nine differences corresponding to these nine pixels (3×3) all exceed threshold TH, is block difference value determination signal RE with logic value "1" output. This block difference value determination signal RE is sent to the other input terminal of AND circuit 62.

In the static picture region, when there is no substantial noise contained in video signal VS and the value of difference e output from difference generating unit 15 is near null, all of the absolute values of the nine differences corresponding to the nine pixels in the 3×3 pixel block with the concerned pixel at the center are near null. Consequently, even when threshold TH is set very low, not all of the nine difference absolute values exceed threshold TH (that is, not all of the nine corresponding difference absolute values are "1"), block difference determination signal RE of logic value "0" is obtained from block difference value determination circuit 58.

When threshold TH is set very low, there are cases in which all of the nine difference absolute values corresponding to the nine pixels of the 3×3 pixel block with the concerned pixel at the center are larger than threshold TH when noise is contained in video signal VS. In this case, block difference determination signal RE of logic value "1" is output from block difference determination circuit 58. However, as pointed out in the above, when noise is contained in video signal VS in the static picture region, block difference polarity determination signal QE of logic value "0" is output from difference polarity determination unit 40. Consequently, motion detecting signal MC of logic value "0" indicating that the pixel is located in the static picture region is output from motion determination unit 60.

In the motion picture region, as a pixel varies over time, the same variation pattern is also displayed by its adjacent pixels (in the 3×3 pixel block); hence, when the nine difference absolute values corresponding to these nine (3×3) pixels all exceed threshold TH (that is, all of the nine difference value determination signals are "1"), a block difference value determination signal RE of logic value "1" is obtained from block difference value determination circuit 58.

AND circuit 62 forms determination unit 60. Only when block difference polarity determination signal QE from difference polarity determination unit 40 is "1", and block difference value determination signal RE from difference value determination unit 50 is "1", motion determination signal MC of logic value "1" indicating the corresponding pixel is in the motion picture region is generated by AND circuit 62. When at least one of block difference polarity determination signal QE and block difference value determination signal RE is "0", motion determination signal MC of logic value "0" indicating the corresponding pixel is in the static picture region is generated by AND circuit 62.

FIGS. 4(A)–4(G) are signal waveforms illustrating the function of motion determination circuit 16 in this embodiment. For example, as shown in FIGS. 4(A) and 4(B), a portion of the picture moves in the horizontal direction for the default picture corresponding to input video signal $VS_i$ as compared to the picture of one previous frame corresponding to delayed video signal $VS_d$. In this case, in the picture region which varies over time, that is, in the motion picture region, as shown in FIGS. 4(C) and 4(E), on each horizontal line, differences e between two video signals $VS_i$ and $VS_d$ for consecutive multiple pixels are the same, and their absolute values |e| exceed threshold TH. As shown in FIGS. 4(D) and 4(F), block difference polarity determination signal QE and block difference value determination signal RE of logic value "1" are output from difference polarity determination unit 40 and difference value determination unit 50, respectively, and, as shown in FIG. 4(G), motion determination signal MC of logic value "1" is output from motion determination unit 60.

In this embodiment, for both the pixel concerned and its adjacent pixels, determination is performed for the polarity and absolute value of the difference between the preceding picture and the default picture. When the difference absolute value is determined, only when the absolute value exceeds threshold TH, can it be taken as the motion picture region. Consequently, as shown in FIGS. 4(C) and 4(G), the logic value of motion determination signal MC tends to become "1" in a region a little narrower than the actual motion picture region. In order to compensate for this gap, for example, as shown in FIG. 5, a horizontal expanding circuit 64 and a vertical expanding circuit 66 may be connected to the output side of motion determination unit 60.

FIGS. 6 and 7 illustrate the circuit configurations of horizontal expanding circuit 64 and vertical expanding circuit 66, respectively. Horizontal expanding circuit 64 has the following configuration: two delay circuits 64B and 64C, which provide 1-pixel-clock delay time (D), are connected to each other in series; output terminals and input terminals 64A of the two delay circuits 64B and 64C are connected to input terminals of 3-input OR gate 64D, and the output terminal of 3-input OR gate 64D is connected to circuit output terminal 64E. On the other hand, vertical expanding circuit 66 has the following configuration: two delay circuits 66B and 66C, which provide 1-horizontal-scan-period delay time (H), are connected to each other in series; output terminals and input terminals 66A of the two delay circuits 66B and 66C are connected to input terminals of 3-input OR gate 66D, and the output terminal of 3-input OR gate 66D is connected to circuit output terminal 66E. FIGS. 8(A)–8(D) illustrate the signal waveforms at the various portions in horizontal expanding circuit 64 and vertical expanding circuit 66.

In this way, motion determination signal MC of logic value "1" from AND circuit 62 initially has its pulse width expanded in the horizontal line direction by means of horizontal expanding circuit 64, and then has its pulse width expanded in the vertical direction by means of vertical expanding circuit 66. In this way, it is possible to ensure that the range in which motion determination signal MC takes logic value "1" (the range indicating the motion picture region) is nearly in agreement with the range of the actual motion picture region.

FIG. 9 illustrates the motion detecting characteristics of the motion detecting circuit of this invention. In this figure, threshold TH corresponds to comparative reference value TH sent to comparator 52 of difference value determination unit 50. The solid characteristic line SL refers to the case when motion detecting output $MS_m$ is taken as a multivalue signal (2-bit or more), while the dashed characteristic line DL refers to the case when motion detecting output $MS_m$ is taken as a binary signal (1-bit). In this embodiment, as pointed out above, determination is made for the polarity and absolute value of the difference between the preceding picture and the default picture for each pixel and its adjacent pixels, and it is possible to make a correct determination between the difference caused by the motion picture and the difference caused by noise. Consequently, it is possible to set threshold TH near null. As a result, even when the motion (variation over time) is small, it is still possible to make a reliable determination on the motion picture region. On the other hand, if there is no motion, it is able to give a reliable determination as a static picture region independent of the presence/absence of noises and the magnitude of noises.

In the circuit configuration of the motion determination circuit shown in FIG. 2, difference polarity determination unit 40 makes a determination on the polarity (sign) of the pixel units between the default picture (input video signal) and the preceding picture (delayed video signal) for each pixel and its eight adjacent pixels (in 3×3 pixel block). Only when all of the nine differences corresponding to the nine pixels have the same polarity of "1" or "0", can block difference polarity determination signal QE of logic value "1" be output. On the other hand, for the configuration of difference value determination unit 50, it makes a determination of the absolute values of differences e in pixel units between the default picture and the preceding picture for each pixel and its eight adjacent pixels (in 3×3 pixel block). Only when all of the nine differences corresponding to the nine pixels in which their absolute values exceed TH, can block difference value determination signal RE of logic value "1" be output.

However, it is possible to slacken the conditions for block difference polarity determination signal QE and block difference value determination signal RE to become logic value "1". For example, in difference value determination unit 50, it is possible to modify block difference value determination circuit 58 appropriately to ensure that when a certain number, for example, six out of the nine block difference value determination signals input at the same time to block difference value determination circuit 58 are "1", block difference value determination signal RE of logic value "1" can be output. In order to make this modification, for example, a logic circuit may be added to block difference value determination circuit 58, or block difference value determination circuit 58 may be composed of adder 68 and comparator 70 as shown in FIG. 10.

Figure 10:
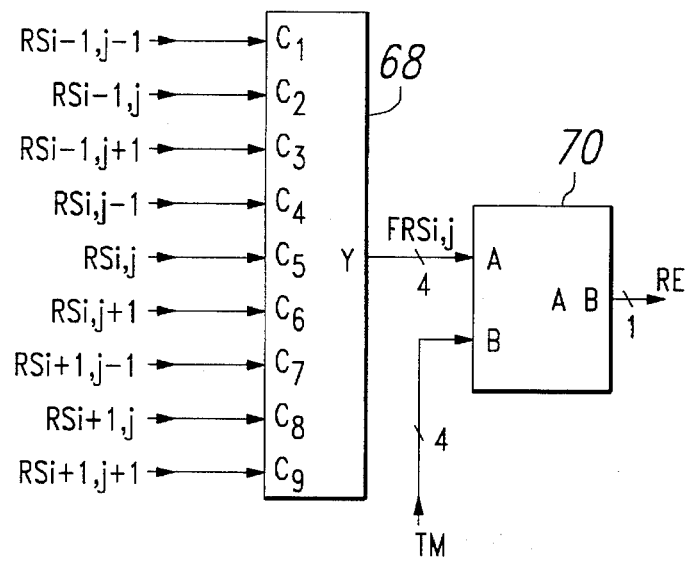
FIG. 10 is a circuit diagram illustrating a modified example of the block difference determination circuit in FIG. 2.

As shown in FIG. 10, in adder 68, the nine difference value determination signals $RS_{i-1,j-1}$, $RS_{i-1,j}$, $RS_{i-1,j+1}$, $RS_{i,j-1}$, $RS_{i,j}$, $RS_{i,j+1}$, $RS_{i+1,j-1}$, $RS_{i+1,j}$, $RS_{i+1,j+1}$ corresponding to eight pixels of each pixel $P_{i,j}$ and its vicinity (inside 3×3 image block) $P_{i-1,j-1}$, $P_{i-1,j}$, $R_{i-1,j+1}$, $P_{i,j-1}$, $P_{i,j+1}$, $P_{i+1,j-1}$, $P_{i+1,j}$, $P_{i+1,j+1}$ are input at the same time to input terminals c1–c9; the logic values of these nine difference value determination signals are added, and the sum value of $FRS_{i,j}$ is output from output terminal Y. Comparator 70 compares sum value $FRS_{i,j}$ from adder 68 with comparison reference value TM (for example, 5). Only when $FRS_{i,j} > TM$, is block difference value determination signal RE of logic value "1" output.

Figure 11:
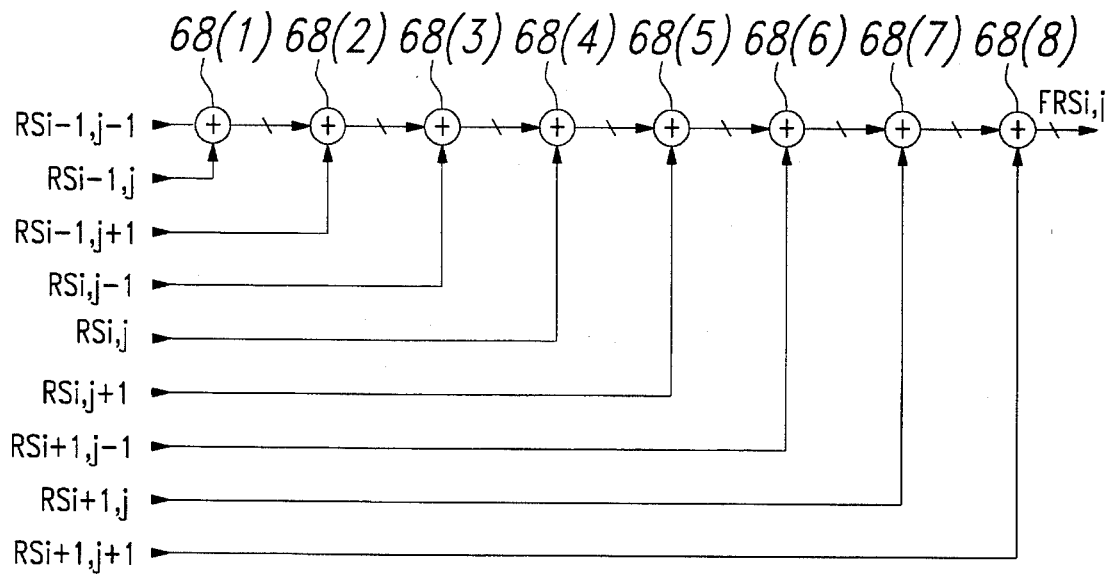
FIG. 11 is a circuit diagram illustrating the specific configuration of the adder in FIG. 10.
Figure 12:
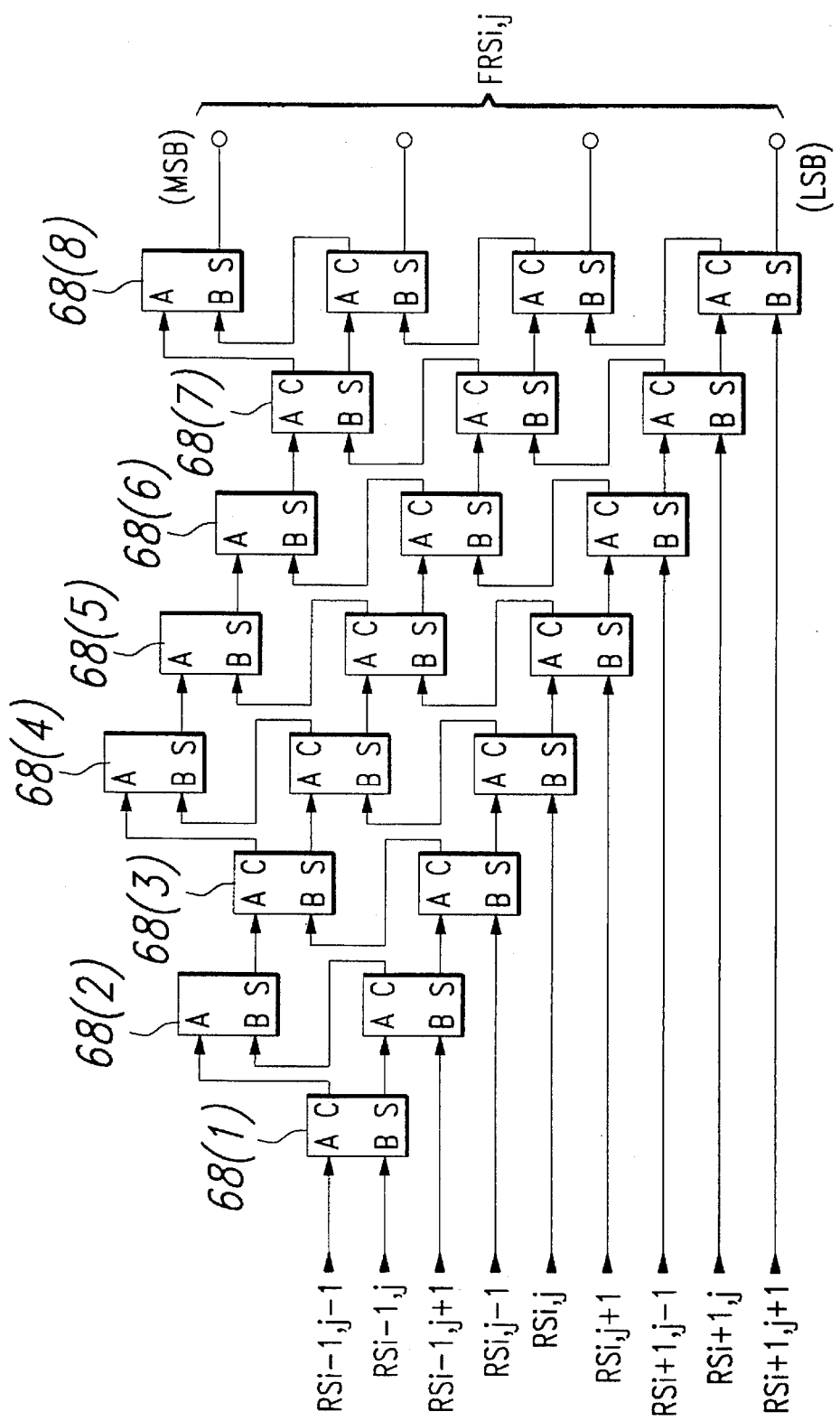
FIG. 12 is a circuit diagram illustrating the configuration of the adder in FIG. 11 in more detail.

FIG. 11 is a circuit diagram illustrating the configuration of adder 68 in FIG. 10. FIG. 12 is a circuit diagram illustrating the details of the circuit shown in FIG. 11. In FIG. 12, each adding unit 68 is composed of a semi adder, with A and B representing the input terminals, S representing the output terminal of the sum, and C representing the carry output terminal.

For difference polarity determination unit 40, the same modification as that made above for difference value determination unit 50 can also be made.

Figure 13:
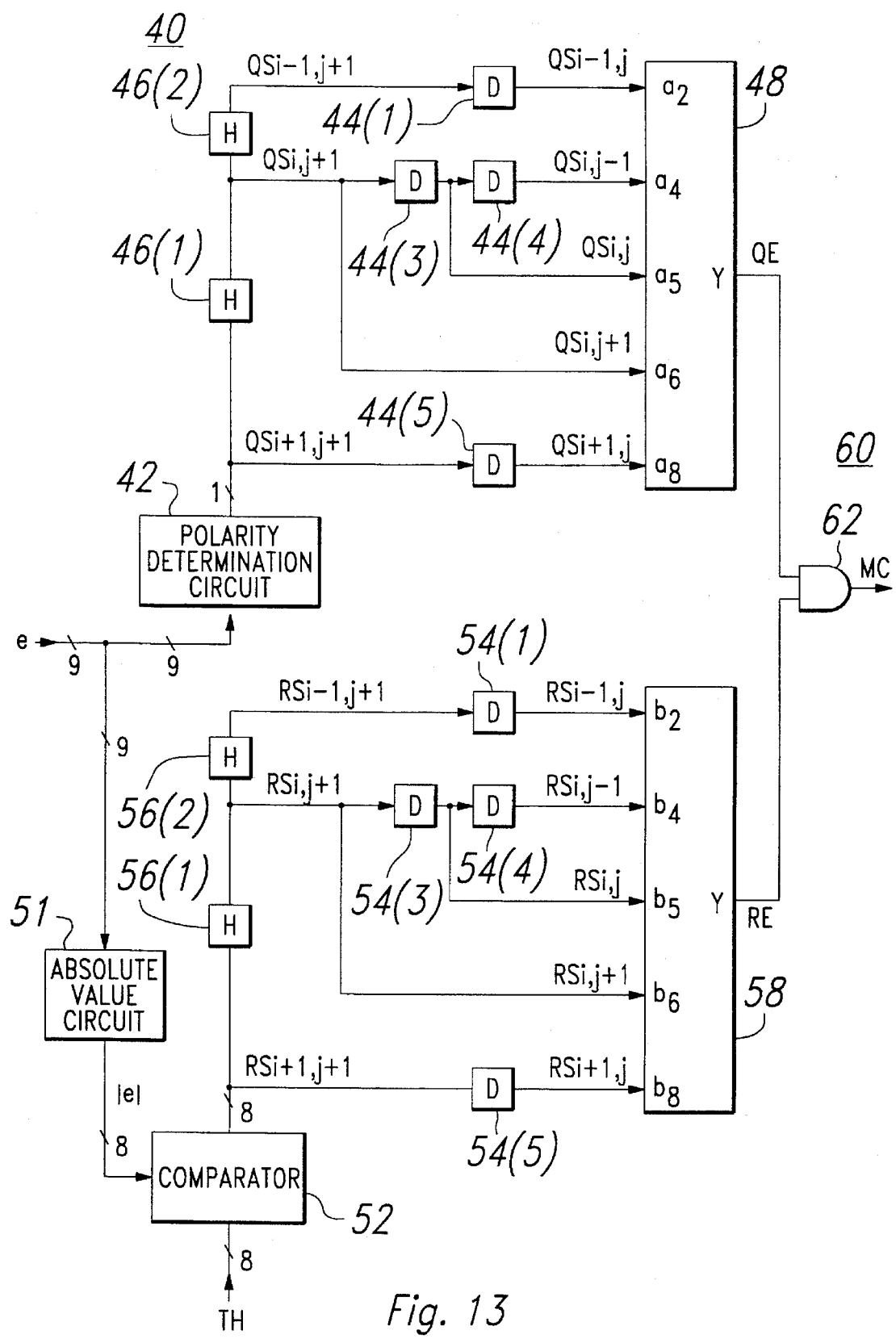
FIG. 13 is a block diagram illustrating a modified example of the motion determination circuit in the embodiment of FIG. 1.

In the aforementioned embodiment, a determination on the difference polarity and difference absolute value is made for the 3×3 pixel block around the concerned pixel. However, this is merely an example of a selection of the adjacent pixels. Other methods may be adopted for this selection. For example, as shown in FIG. 13, it is possible to select the four pixels $P_{i-1,j}$, $P_{i,j-1}$, $P_{i,j+1}$, and $P_{i+1,j}$ above, below and beside pixel $P_{i,j}$. In this case, difference polarity determination unit 40 and difference value determination unit 50 in motion determination circuit 16 can be modified as shown in FIG. 13.

Figure 14:
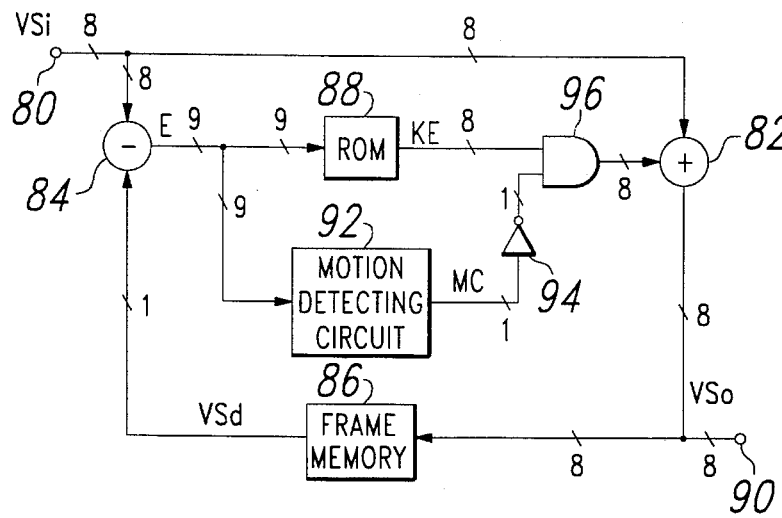
FIG. 14 is a block diagram illustrating the noise reducing circuit in an embodiment of this invention.
Figure 15:
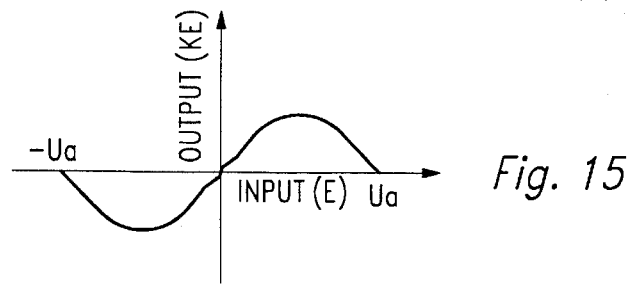
FIG. 15 is a graph illustrating the input/output characteristics of the coefficient multiplier in the noise reducing circuit of FIG. 14.

In the following, an explanation will be presented for the noise reducing circuit using the motion detecting circuit of this invention as shown in FIGS. 14 and 15.

FIG. 14 is a diagram illustrating the noise reducing circuit in an embodiment of this invention which can be used in MUSE decoder. In this noise reducing circuit, an 8-bit TV signal after demodulation and A/D conversion is input to input terminal 80 as a input video signal $VS_i$. This input video signal $VS_i$ is sent to one input terminal of adder 82 and one input terminal of subtractor 84. The other input terminal of subtractor 84 receives delay video signal $VS_d$, that is, the video signal of the second from last frame (one previous picture in the MUSE scheme) from frame memory 86. In subtractor 84, delayed video signal $VS_d$ is subtracted from input video signal $VS_i$ to obtain the difference in pixel units. The 9-bit difference signal e output from subtractor 84 is sent to coefficient multiplier 88 in the form of a ROM (look-up table), where it is multiplied by a coefficient K. Coefficient K is not a constant. It is selected in accordance with the value of the input based on the nonlinear input/output characteristics shown in FIG. 15.

As shown in FIG. 15, in the input/output characteristics of coefficient multiplier 88, when the input value (difference value E) exceeds upper limit value $U_a$, the output value (corrected difference value KE) is set to null. This is the so-called limiter function, according to which, when difference value E exceeds upper limit value $U_a$, it is taken as the motion picture region, and the output value (corrected difference value KE) is set to null, so that input video signal $VS_i$ is directly taken as the output video signal $VS_o$. In order to realize effective noise reduction for an input video signal $VS_i$ of the static picture region containing significant noise, it is preferred that upper limit value $U_a$ be set as large as possible. However, in the conventional noise reducing circuit, even in the actual motion picture region, when motion is small and difference value E drops below upper limit value $U_a$, the noise reducing operation is not performed as desired on input video signal $VS_i$, leading to blurring, a residual image, or other degradation in the image quality. However, by using the noise reducing circuit of this invention, this problem can be solved due to the effect of the motion detecting circuit as to be explained in the following.

As shown in FIG. 14, an 8-bit corrected difference value KE output from coefficient multiplier 88 is sent through AND circuit 96 to the other input terminal of adder 82. Adder 82 adds corrected difference value KE to input video signal $VS_i$. The output signal of adder 82 is sent from output terminal 90 as output video signal $VS_o$ to frame memory 86.

In this noise reducing circuit, the following formula is established for adder 82:

$$VS_o = VS_i + KE \qquad (1)$$

For subtractor 84, the following formula is established:

$$E = VS_i - Z^{-1} \cdot VS_o \qquad (2)$$

where, $Z^{-1}$ represents the delay time of frame memory 86, and it corresponds to 1/15 sec in the case of the MUSE format.

From the formulas (1) and (2), the input/output characteristics or transfer function between input video signal $VS_i$ and output video signal $VS_o$ can be expressed as follows:

$$VS_o/VS_i = (1+K)/(1-KZ^{-1}) \qquad (3)$$

On the other hand, as the noises are not correlated to each other, between noise $N_i$ contained in input video signal $VS_i$ and noise $N_o$ contained in output video signal $VS_o$, the following input/output characteristics or transfer function is established:

$$N_o/N_i = ((1+K)^2/(1-K^2))^{1/2} \qquad (4)$$

Consequently, by using this noise reducing circuit, the signal-to-noise ratio (S/N ratio) can be increased by $(1+K/1-K)^{1/2}$ times. That is, the noise level can be reduced.

In the noise reducing circuit in this embodiment, motion determination circuit 92 and NOT circuit 94 are arranged in parallel with coefficient multiplier 88. This motion detecting circuit 92 may have the same configuration and function as those of motion determination circuit 16 in the aforementioned embodiment, and it forms the noise reducing circuit together with subtractor 84 and frame memory 86.

In motion determination circuit 92, as in the embodiment, a determination is made on the polarity and absolute value of the difference in units of pixels between the preceding picture and the default picture for each pixel and the prescribed adjacent pixels. Based on the results of the determination made on the overall difference polarity and difference absolute value for these adjacent pixels, 1-bit motion determination signal MC, which represents whether the pixel is in the motion picture region, is generated.

Consequently, when motion determination signal MC of logic value "1" representing the motion picture region is output from motion detecting circuit 92, corrected difference value KE from coefficient multiplier 88 is masked by AND circuit 96; without adding corrected difference value KE at adder 82, that is, without performing the noise reducing procedure, input video signal $VS_i$ is sent directly as output video signal $VS_o$ to output terminal 90 and frame memory 86. When motion determination signal MC of logic value "0" representing the static picture region is output from motion detecting circuit 92, corrected difference value KE is sent from coefficient multiplier 88 to adder 82 through AND circuit 96, and corrected difference value KE is added to input video signal $VS_i$, and the noise reducing procedure is performed.

In the noise reducing circuit in this embodiment, if it is in the static picture region, motion determination signal MC of logic value "0" can be output reliably independent of the presence/absence and magnitude of the noise from motion detecting circuit 92. Consequently, the noise reducing procedure can be performed reliably. On the other hand, if it is in the motion picture region, motion determination signal MC of logic value "1" can be output reliably independent of the magnitude of the noise from motion detecting circuit 92. Consequently, the noise reducing procedure is inhibited. In this way, even when upper limit value $U_a$ in the input/output characteristics (FIG. 15) is set high for coefficient multiplier 88, the noise reducing procedure, not desired in this case, can be inhibited, and residual image or other degradation in the image quality can be prevented.

The motion detecting circuit of this invention is not limited to the noise reducing circuit. It may also be used in other cases, such as NTSC-format TV receiver's Y/C isolation unit, blending/switching of the static picture and motion picture in high-definition MUSE decoder, etc.

As explained above, for the motion detecting circuit of this invention, by determining the polarity and magnitude of the difference between the input video signal and the delayed video signal for each pixel and its adjacent pixels, a determination is made as to whether a pixel is in the motion picture region or static picture region based on the results of the determination. Consequently, correct motion detection can be performed independently of the magnitude of the motion, presence/absence of noises, magnitude of the noises, etc.

Also, in the noise reducing circuit of this invention, by determining the polarity and magnitude of the difference between the input video signal and the delayed video signal for each pixel and its adjacent pixels, a determination is made as to whether a pixel is in the motion picture region or static picture region based on the results of the determination; based on the results of the determination of the motion, the noise reducing procedure is inhibited for the motion picture region, while it is performed effectively in the static picture region independent of the magnitude of the motion. Consequently, it is possible to prevent a residual image or other degradation in the picture quality.

I claim:

1. A motion detecting circuit for detecting in pixel units a motion picture region on the picture display as produced from a video signal input, said motion detecting circuit comprising:

delay means for producing a delayed video signal output delayed by at least one picture unit;

difference generating means for receiving a video signal input and the delayed video signal output from said delay means and providing a difference video signal between the video signal input and the delayed video signal output;

motion determination means including difference polarity determination means for operating upon a selected pixel and a plurality of adjacent pixels which define therewith a pixel block, said difference polarity determination means including a polarity determination circuit, a plurality of sample delay circuits respectively providing one pixel-clock delay times, line delay circuits operably connected to said plurality of sample delay circuits for providing one-horizontal scan period delay times, and a difference polarity determination circuit for generating an output logic signal having a logic value of "1" in response to receiving a plurality of input binary signals, at least a majority of which are at the same logic value;

said polarity determination circuit determining a polarity of a difference value, e, for each pixel included in the pixel block depending upon whether the polarity of the difference value, e, for the pixel is positive or negative and producing an output as a one-bit difference polarity determination signal; and difference value determination means for determining a magnitude of the difference value derived using said difference generating means and the other prescribed pixels in the pixel block;

said motion determination means determining whether a pixel is in the motion picture region or in a static picture region and providing a motion determination signal as an output at one of two logic values "1" and "0" depending upon whether the pixel is in the motion picture region or in the static picture region.

2. A motion detecting circuit as set forth in claim 1, wherein said difference polarity determination circuit generates an output logic signal having a logic value of "1", when all of the plurality of input binary signals as received thereby are of the same logic value.

3. A motion detecting circuit as set forth in claim 1, wherein said line delay circuits comprise first and second line delay circuits connected in series, and said plurality of sample delay circuits are arranged such that respective pairs of circuits are connected in parallel across the respective inputs and outputs of said first and second line delay circuits;

said polarity determination circuit being connected in series with said first and second line delay circuits;

said difference polarity determination circuit comprising a block difference polarity determination circuit connected to the respective outputs of each of said sample delay circuits, said first and second line delay circuits, and said polarity determination circuit;

said polarity determination circuit being responsive to a difference video signal between the video signal input and the delayed video signal input for determining the polarity of the difference value, e, for each pixel in the pixel block and producing the polarity determination signal as an output having a first logic value for a positive polarity and a second logic value for a negative polarity;

the polarity determination signal from said polarity determination circuit being provided as an input to each of the plurality of sample delay circuits and said first and second line delay circuits; and said block difference polarity determination circuit producing a difference polarity determination signal as an output logic signal in response to the inputs from each of the plurality of sample delay circuits, the first and second line delay circuits, and said polarity determination circuit having a logic value dependent thereon, the logic value of the difference polarity determination signal being logic "1" if all of the inputs thereto are either all logic "1" or all logic "0".

4. A motion detecting circuit as set forth in claim 1, wherein said line delay circuits comprise first and second line delay circuits connected in series, and said plurality of sample delay circuits are arranged such that at least one sample delay circuit is connected across the respective inputs and outputs of said first and second line delay circuits;

said polarity determination circuit being connected in series with said first and second line delay circuits;

said difference polarity determination circuit being connected in series with said first and second line delay circuits;

said difference polarity determination circuit comprising a block difference polarity determination circuit connected to the respective outputs of each of said sample delay circuits, said first and second line delay circuits, and said polarity determination circuit;

said polarity determination circuit being responsive to a difference video signal between the video signal input and the delayed video signal input for determining the polarity of the difference value, e, for each pixel in the pixel block and producing the polarity determination signal as an output having a first logic value for a positive polarity and a second logic value for a negative polarity;

the polarity determination signal from said polarity determination circuit being provided as an input to each of the plurality of sample delay circuits and said first and second line delay circuits; and said block difference polarity determination circuit producing a difference polarity determination signal as an output logic signal in response to the inputs from each of the plurality of sample delay circuits, the first and second line delay circuits, and said polarity determination circuit having a logic value dependent thereon, the logic value of the difference polarity determination signal being logic "1" if all of the inputs thereto are either all logic "1" or all logic "0".

5. A motion detecting circuit as set forth in claim 1, wherein said difference value determination means includes an absolute value circuit, a comparator, a plurality of sample delay circuits respectively providing one pixel-clock delay times, line delay circuits operably connected to said plurality of sample delay circuits of said difference value determination means for providing one-horizontal scan period delay times, and a difference polarity determination circuit for generating an output logic signal having a logic value of "1" in response to receiving a plurality of input binary signals, at least a majority of which are at the same logic value;

said absolute value circuit being connected to said difference generating means for receiving the difference video signal between the video signal input and the delayed video signal output and providing an absolute value output signal; and said comparator being connected to said absolute value circuit and having respective inputs for receiving the absolute value output signal from said absolute value circuit and a reference threshold value for comparison of the absolute value output signal with a threshold value, said comparator producing an output logic signal at one of two logic values "1" and "0" as a one-bit difference value determination signal dependent upon whether the absolute value output signal from said absolute value circuit exceeds the reference threshold value, thereby taking on a logic value of "1", or conversely, is equal to or less than the reference threshold value for taking on a logic value of "0".

6. A motion detecting circuit as set forth in claim 1, wherein said difference value determination means includes an absolute value circuit, a comparator, and adder means having a plurality of input terminals for receiving the difference value determination signals for each of the selected pixel and the plurality of adjacent pixels defining the pixel block therewith and providing a sum value output signal; and said comparator being connected to the adder means and having respective inputs for receiving the sum value output signal from said adder means and a reference threshold value for comparison of the sum value output signal with a threshold value, said comparator producing an output logic signal at one of two logic values "1" and "0" dependent upon whether the sum value output signal from said adder means exceeds the reference threshold value, thereby taking on a logic value of "1", or conversely, is equal to or less than the reference threshold value for taking on a logic value of "0".

7. A motion detecting circuit as set forth in claim 3, wherein said plurality of sample delay circuits and said first and second line delay circuits included in said difference polarity determination means are applicable to a 3×3 pixel block.

8. A motion detecting circuit as set forth in claim 4, wherein said plurality of sample delay circuits and said first and second line delay circuits included in said difference polarity determination means are applicable to the selected pixel and four adjacent pixels disposed above, below, and beside the selected pixel in defining the pixel block.

9. A motion detecting circuit as set forth in claim 5, wherein said line delay circuits included in said difference value determination means comprise first and second line delay circuits connected in series, and said plurality of sample delay circuits included in said difference value determination means are arranged such that respective pairs of sample delay circuits are connected in parallel across the respective inputs and outputs of said first and second line delay circuits;

said comparator being connected in series with said first and second line delay circuits;

said difference polarity determination circuit of said difference value determination means being a block difference polarity determination circuit connected to the respective outputs of each of said sample delay circuits, said first and second line delay circuits, and said comparator;

the one-bit difference value determination signal as output from said comparator in response to a comparison of the absolute value output signal from said absolute value circuit with the predetermined reference threshold value being provided as an input to each of the plurality of sample delay circuits and said first and second line delay circuits of said difference value determination means; and said block difference polarity determination circuit of said difference value determination means producing a difference value determination signal as an output logic signal in response to the inputs of each of the plurality of sample delay circuits, the first and second line delay circuits, and said comparator having a logic value dependent thereon, the logic value of the difference value determination signal being logic "1" if all of the inputs thereto are either all logic "1" or all logic "0".

10. A motion detecting circuit as set forth in claim 9, further including a logic output gate connected to said block difference polarity determination circuit of said motion determination means and said difference value determination means for receiving as inputs the outputs from said block difference polarity determination circuit of said motion determination means and said block difference value determination circuit of said difference value determination means and producing a logic value output signal at one of two logic values "1" and "0", the logic value of the output signal being logic "1" if both of the inputs thereto have the same logic value.

11. A noise reduction circuit for reducing the noise contained in a video signal, said noise reduction circuit comprising:

delay means for providing a delayed video signal output delayed by at least one picture unit;

difference generating means for receiving a video signal input and the delayed video signal output from said delay means and providing a difference video signal between the video signal input and the delayed video signal output;

noise reduction processing means for receiving the video signal input and performing a noise reduction processing on the video signal input based upon the difference video signal as provided by said difference generating means;

motion determination means including difference polarity determination means for operating upon a selected pixel and a plurality of adjacent pixels which define therewith a pixel block, said difference polarity determination means including a polarity determination circuit, a plurality of sample delay circuits respectively providing one pixel-clock delay times, line delay circuits operably connected to said plurality of sample delay circuits for providing one horizontal scan period delay times, and a difference polarity determination circuit for generating an output logic signal having a logic value of "1" in response to receiving a plurality of input binary signals, at least a majority of which are at the same logic value;

said polarity determination circuit determining a polarity of a difference value, e, for each pixel included in the pixel block depending upon whether the polarity of the difference value, e, for the pixel is positive or negative and producing an output as a one-bit difference polarity determination signal;

difference value determination means for determining a magnitude of the difference value respectively derived using said difference generating means and the other prescribed pixels in the pixel block;

said motion determination means determining whether a pixel is in a motion picture region or in a static picture region and providing a motion determination signal as an output at one of two logic values "1" and "0" depending upon whether the pixel is in the motion picture region or in the static picture region; and noise reduction processing inhibiting means for inhibiting said noise reduction processing means in response to the results of determination of said motion determination means indicating that the pixel is in the motion picture region.

* * * * *